(12) United States Patent
Yatake et al.

(10) Patent No.: US 7,553,885 B2
(45) Date of Patent: Jun. 30, 2009

(54) INK FOR INKJET RECORDING

(75) Inventors: Masahiro Yatake, Nagano-ken (JP); Yasuhiro Oki, Nagano-ken (JP); Motoki Masuda, Nagano-ken (JP); Hiroko Hayashi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 324 days.

(21) Appl. No.: 11/407,380

(22) Filed: Apr. 19, 2006

(65) Prior Publication Data
US 2007/0054980 A1  Mar. 8, 2007

(30) Foreign Application Priority Data
Sep. 6, 2005 (JP) .............................. 2005-257569

(51) Int. Cl.
*C09D 11/00* (2006.01)
(52) U.S. Cl. ...................... 523/160; 524/556
(58) Field of Classification Search ............. 106/31.13, 106/218; 523/160; 524/366; 347/54, 56, 347/68, 73, 100, 112
See application file for complete search history.

(56) References Cited

U.S. PATENT DOCUMENTS

| 2,083,372 | A | | 6/1937 | Guthmann |
| 5,156,675 | A | | 10/1992 | Breton et al. |
| 5,183,502 | A | | 2/1993 | Meichsner et al. |
| 5,196,056 | A | | 3/1993 | Prasad |
| 6,368,397 | B1 | * | 4/2002 | Ichizawa et al. ......... 106/31.65 |
| 6,378,999 | B1 | * | 4/2002 | Doi et al. .................... 347/100 |
| 6,613,436 | B2 | * | 9/2003 | Ambrose et al. ............ 428/413 |
| 6,624,249 | B2 | * | 9/2003 | Ambrose et al. ............ 525/159 |
| 6,663,972 | B2 | * | 12/2003 | Ambrose et al. ......... 428/423.1 |
| 6,784,258 | B2 | * | 8/2004 | Ambrose et al. ............ 525/424 |
| 6,797,387 | B2 | * | 9/2004 | Ambrose et al. ......... 428/424.4 |
| 7,268,176 | B2 | * | 9/2007 | Ambrose et al. ............ 524/262 |
| 7,307,109 | B2 | * | 12/2007 | Yatake et al. ............... 523/160 |

FOREIGN PATENT DOCUMENTS

| JP | 56-147861 | 11/1981 |
| JP | 09-111165 | 4/1997 |

OTHER PUBLICATIONS

Jozef Bicerano "Prediction of Polymer Properties," published by CRC Press (2002), pp. 308-310.*
Patent Abstracts of Japan of JP 56-147861 dated Nov. 17, 1981.
Patent Abstracts of Japan of JP 09-111165 dated Apr. 28, 1997.

* cited by examiner

*Primary Examiner*—David Wu
*Assistant Examiner*—Vu Nguyen
(74) *Attorney, Agent, or Firm*—Ladas and Parry LLP

(57) ABSTRACT

An ink for inkjet recording of the invention includes water and a pigment, where the pigment is dispersed using a polymer having a refractive index of at least 1.58 or more, an acid value of 50 mgKOH/g to 120 mgKOH/g, and a weight average molecular weight of 20000 to 120000. It is preferable that the polymer is prepared by using a (meta)acrylate and/or a sulfur-containing (meth)acrylate which have at least a plurality of aromatic rings.

3 Claims, No Drawings

INK FOR INKJET RECORDING

BACKGROUND OF THE INVENTION

1. Field of the Invention

The present invention relates to an ink for inkjet recording having excellent stability, high coloring on regular paper, high gloss on gloss paper and excellent discharge stability from an inkjet head.

2. Description of the Related Art

Inkjet recording is a process that ejects an ink as small droplets from a minute nozzle to record characters or images on a surface of a recording medium. Techniques of inkjet recording which have been put into practical use include: a method of converting electrical signals to mechanical signals with an electrostrictive element and intermittently ejecting an ink stored in a nozzle head to record characters or images on a surface of a recording medium; and a method of bubbling an ink stored in a nozzle head by rapidly heating that part of the ink which is located very close to the orifice and intermittently ejecting the ink based on the volume expansion caused by the bubbling to thereby record characters or images on a surface of a recording medium. An ink for inkjet recording, when used in printing onto a paper as the recording medium, is required to have characteristics such as no blurring, good drying characteristic, uniformity of printability, and no mixture property with adjacent colors in multicolor printing such as color printing.

In the conventional ink, particularly in a variety of kinds of ink using a pigment, the wettability of the ink to the surface of a paper is suppressed by mainly controlling the permeability, and print quality is secured by confining ink drops near the surface of the paper. However, when the wettability to the paper is suppressed in an ink, the extent of blurring varies according to paper types. Particularly, when printing onto a recycled paper which has various components mixed therein, the blurring occurs due to the difference in wettability characteristics of the ink to each of the components. In addition, it takes relatively a long time to dry the printing using such an ink and adjacent colors tend to be mixed in multicolor printing such as color printing. There is another problem that rubbing resistance is worsened when a pigment is used as a color material in an ink, since the pigment remains on the surface of a paper.

In order to solve these problems, the enhancement of the permeability to a paper of the ink has been attempted, and there have been examined the addition of diethylene glycol monobutyl ether (U.S. Pat. No. 5,156,675, specification), the addition of Surfynol 465 (manufactured by Nissin Chemical Industry Corporation) as an acetylene glycol system surfactant (U.S. Pat. No. 5,183,502, specification), or the addition of both the diethylene glycol monobutyl ether and the Surfynol 465 (U.S. Pat. No. 5,196,056, specification). Or the use of ethers of diethylene glycol for ink has been examined (U.S. Pat. No. 2,083,372, specification).

It is generally difficult to improve the permeability of an ink using a pigment while securing the dispersion stability of the pigment, and available penetrating agent is limited for such an ink. Therefore, some conventional combinations of the glycol ether and pigment include an example in which triethylene glycol monomethyl ether is used for the pigment (Japanese Published Unexamined Patent Application No. H56-147861), and an example or the like using ethers of ethylene glycol, diethylene glycol or triethylene glycol (Japanese Published Unexamined Patent Application No. H09-111165).

SUMMARY OF THE INVENTION

However, the printing quality of the conventional aqueous ink was inadequate, and a large amount of blurring was generated when the printing was carried out on a regular paper such as PPC paper. Also, color density and coloration properties were also inadequate. In addition, since the conventional dispersion is unstable, the absorption and desorption of dispersed resin from the pigment easily occur when a substance having a hydrophilic part and a hydrophobic part, such as a surfactant and glycol ether, exist in the ink, and the preservation stability of the aqueous ink is accordingly lowered. In order to reduce the blurring of the printing, substances having the hydrophilic part and the hydrophobic part such as the surfactant and the glycol ether are required for typical aqueous ink. Without these substances, the permeability of the ink to the paper became inadequate, and the paper types were limited in order to perform uniform printing, thus leading to deterioration in quality of printed images.

Furthermore, a long-term preservation stability was not obtained in the conventional ink using additive agents (an acetylene glycol, an acetylene alcohol and a silicone surfactant, di(tri)ethylene glycol monobutyl ether, (di)propylene glycol monobutyl ether or 1,2-alkylene glycol or the mixture thereof). Since the redissolvability of the ink was poor, the ink was dried and clogged easily at the tip or the like of the nozzle of the inkjet head. When a gloss paper is used in printing with the pigment ink for inkjet recording, since the ink remains on the surface of the gloss paper and thus the gloss level is low.

Taking into account the above described drawbacks, an object of the present invention is to provide an ink for inkjet recording, which attains high coloring on a regular paper, high gloss on gloss paper and excellent discharge stability from an inkjet head.

In order to remove at least part of the above drawbacks, an ink for inkjet recording comprising water and a pigment, wherein the pigment is dispersed using a polymer having a refractive index of at least 1.58 or more, an acid value of 50 mgKOH/g to 120 mgKOH/g, and a weight average molecular weight of 20000 to 120000.

DESCRIPTION OF THE PREFERRED EMBODIMENTS

The present invention has been made by conducting earnest studies in view of required characteristics for an ink for inkjet recording, such as excellent light resistance, high coloring on regular paper, high gloss on specialized paper and excellent discharge stability from the inkjet head.

An ink for inkjet recording comprising water and a pigment, wherein the pigment is dispersed using a polymer having a refractive index of at least 1.58 or more, an acid value of 50 mgKOH/g to 120 mgKOH/g, and a weight average molecular weight of 20000 to 120000. The refractive index of a polymer of 1.58 or more decreases the flip-flop phenomenon in which the gloss on gloss paper and the reflected light are different from the original color. An acid value of a polymer of less than 50 mgKOH/g provides no dispersion stability. An acid value exceeding 120 mgKOH/g reduces coloration properties on regular paper such as PPC paper. The weight average molecular weight of a polymer of less than 20000 or exceeding 120000 provides no dispersion stability.

In the present invention, it is preferable that a polymer having a refractive index of 1.58 or more is prepared using the (meta)acrylate and/or sulfur-containing (meth)acrylate which have at least a plurality of aromatic rings.

In the present invention, it is more preferable to use 1,2-alkylene glycol. It is preferable that the 1,2-alkylene glycol is 1,2-hexanediol and/or 1,2-pentanediol. Since the drying characteristics of the print is improved by the addition thereof and a previously printed part is not transferred onto the rear surface of a subsequent medium even when continuous printing is carried out, high-speed printing is enabled. In order not to blur even if the printing speed of the ink for inkjet recording as the present invention is accelerated and in order to enhance printing stability, the surface tension of the ink is set to 20 mN/m to 40 mN/m. Therefore, it is also preferable to add at least an alkylene glycol monoalkyl ether. It is preferable that the alkylene glycol monoalkyl ether is an alkylene glycol having a repeating unit of 10 or less and an alkyl ether having 4 to 10 carbon atoms. It is preferable that the alkylene glycol monoalkyl ether is di(tri)ethylene glycol monobutyl ether and/or (di)propylene glycol monobutyl ether as the example.

In the present invention, it is preferable to use an acetylene glycol-based surfactant and/or an acetylene alcohol-based surfactant. The blurring on the regular paper is particularly reduced by using these surfactants, and dot diameters on the specialized paper can be extended to an optimum width.

It is preferable that the added amount of the acetylene glycol-based surfactant and/or acetylene alcohol-based surfactant is 0.1% to 5%.

It is more preferable that the ink of the present invention contains at least the above acetylene glycol-based surfactant and/or acetylene alcohol-based surfactant, and 1,2-alkylene glycol. Furthermore, it is preferable that the ink of the present invention contains di(tri)ethylene glycol monobutyl ether and/or (di)propylene glycol monobutyl ether.

It is more preferable that the added amount of the above acetylene glycol-based surfactant and/or acetylene alcohol-based surfactant is 0.01% to 0.5%, and the added amount of the 1,2-alkylene glycol is 1% or more. Furthermore, it is preferable that the added amount of the di(tri)ethylene glycol monobutyl ether and/or (di)propylene glycol monobutyl ether is 1.0% or more.

Thus, the ink for inkjet which has high coloring on regular paper, high gloss on specialized paper and excellent discharge stability of the ink from the inkjet head can be provided by preparing the above ink for inkjet recording.

As the pigment capable of being used for the present invention, examples of pigments for black ink include carbon blacks (C. I. Pigment Black 7), such as furnace black, lamp black, acetylene black and channel black; metals such as copper oxides, iron oxides (C. I. Pigment Black 11) and titanium oxide; and organic pigments such as aniline black (C. I. Pigment Black 1). The carbon black which is comparatively low in specific density and does not settle readily in water is preferable for inkjet.

Furthermore, for color inks, there can be used C. I. Pigment Yellow 1 (Fast Yellow G), 3, 12 (Dis-Azo Yellow AAA), 13, 14, 17, 24, 34, 35, 37, 42 (Yellow Iron Oxide), 53, 55, 74, 81, 83 (Dis-Azo Yellow HR), 93, 94, 95, 97, 98, 100, 101, 104, 108, 109, 110, 117, 120, 128, 138, 153, 180, C. I. Pigment Red 1, 2, 3, 5, 17, 22 (Brilliant Fast Scarlet), 23, 31, 38, 48:2 (Permanent Red 2B (Ba)), 48:2 (Permanent Red 2B (Ca)), 48:3 (Permanent Red 2B (Sr)), 48:4 (Permanent Red 2B (Mn)), 49:1, 52:2, 53:1, 57:1 (Brilliant Caimine6B), 60:1, 63:1, 63:2, 64:1, 81 (Rhodamine 6G Lake), 83, 88, 101 (Red Iron Oxide), 104, 105, 106, 108 (Cadmium Red), 112, 114, 122 (Quinacridone Magenta), 123, 146, 149, 166, 168, 170, 172, 177, 178, 179, 185, 190, 193, 202, 206, 209, 219, C. I. Pigment Violet 19, 23, C. I. Pigment Orange 36, C. I. Pigment Blue 1, 2, 15 (Phthalocyanine Blue R), 15:1, 15:2, 15:3 (Phthalocyanine Blue G), 15:4, 15:6 (Phthalocyanine Blue E), 16, 17:1, 56, 60, 63, C. I. Pigment Green 1, 4, 7, 8, 10, 17, 18, 36 or the like.

Thus, various pigments can be used as a colorant, however, preferable cases are a case of coexistence with a polymer such as the case where the pigment is dispersed by using a polymer or a case where polymer fine particles are used.

The pigment used for the present invention is dispersed by using a dispersing machine, and commercially available various dispersing machines can be used as the dispersing machine. A non-media dispersion is preferable. Specific examples include a wet jet mill (SINUS COMPANY), Nanomizer (NANOMIZER COMPANY), Homogenizer (GAULIN COMPANY), Ultimaizer (SUGINO MACHINE COMPANY) and Microfluidizer (MICROFLUIDICS COMPANY).

The amount of the pigment added to the ink of the invention is preferably 0.5 to 30%, and more preferably 1.0 to 15%. The added amount of 0.5% or less cannot secure printing density. The added amount of 30% or more tends to cause an increase in viscosity and generation of structural viscosity in the viscosity characteristic of the ink to worsen the discharge stability of the ink from the inkjet head.

Examples of the vehicle components of the ink for inkjet recording of the present invention include a surfactant, an organic solvent and a moisturizer. It is preferable that at least the surfactant is added since the surface tension of 20 mN/m to 40 mN/m extends the dot diameters printed by inkjet to the optimal width.

In order to secure self stability, stable discharge from the inkjet head, improvement in regard to clogging, or prevention of ink degradation, various types of additives may be added to the ink of the invention. Examples of the additive include a humectant, a dissolution aid, a penetration controlling agent, a viscosity modifier, a pH adjustor, an antioxidant, a preservative, an antifungal agent, an corrosion inhibitor, a chelate for capturing metal ions which affect dispersion.

The present application claims the benefit of priority from Japanese patent application No. 2005-257569 filed on Sep. 6, 2005, the entire contents of which are incorporated herein by reference.

EXAMPLES

Hereinafter, specific embodiments of the present invention will be described. Although an example using a pigment dispersed by using the most preferable polymer is shown as Examples, the present invention is not limited to these Examples.

(Preparation of Highly Refractive Acrylates A1 and A2 and Highly Refractive Methacrylates M1 and M2)

An acrylate having multiple aromatic rings is prepared as highly refractive acrylates A1 and A2. The highly refractive acrylate A1 is prepared by the esterification of trityl alcohol and acrylic acid in an acidity using a known method and the distillation refining thereof. The highly refractive acrylate A2 is prepared by the addition of 1 mol of an ethylene oxide to the trityl alcohol in the presence of an alkali catalyst, the distillation refining thereof, the esterification of the trityl alcohol and acrylic acid in the acidity using a known method, and the distillation refining thereof. The methacrylate can also be similarly prepared by using a methacrylic acid instead of the acrylic acid. The methacrylate prepared as in A1 is represented by M1, and the methacrylate prepared as in A2 is represented by M2.

(Preparation of Highly Refractive Acrylates A3 and A4 and Highly Refractive Methacrylates M3 and M4)

A sulfur-containing acrylate is prepared as a highly refractive acrylate 3. The highly refractive acrylate 3 is prepared by the esterification of trityl mercaptan and acrylic acid in an acidity using a known method and the distillation refining thereof. The highly refractive acrylate 4 is prepared by the addition of 1 mol of an ethylene oxide to the trityl mercaptan in the presence of an alkali catalyst, the distillation refining thereof, the esterification of the trityl mercaptan and acrylic acid in an acidity using a known method and the distillation refining thereof. The methacrylate can also be similarly prepared by using the methacrylic acid instead of the acrylic acid. The methacrylate prepared as in A3 is represented by M3, and the methacrylate prepared as in A4 is represented by M4.

Example 1

(Manufacturing of Pigment Dispersion 1)

As a pigment dispersion 1, there was used Monarch 880 manufactured by U.S. Cabot Corporation as carbon black (PBk7). After a gas in a reaction vessel equipped with a stirrer, a thermometer, a reflux pipe and a dropping funnel is replaced with nitrogen, 25 parts of the above highly refractive acrylate A1, 25 parts of the above highly refractive methacrylate M1, 10 parts of a benzyl acrylate, 2 parts of an acrylic acid, and 0.3 parts of t-dodecyl mercaptan were put in the reaction vessel and heated at 70° C. 50 parts of the above highly refractive acrylate A2 independently prepared, 50 parts of the above highly refractive meta-acrylate M1, 50 parts of the above highly refractive meta-acrylate M2, 15 parts of the acrylic acid, 5 parts of a butyl acrylate, 1 part of t-dodecyl mercaptan, 20 parts of methyl ethyl ketone and 1 part of sodium persulfate were put into the dropping funnel, and the polymerization reaction of the dispersed polymer was carried out while being dropped into the reaction vessel for 4 hours. Next, methyl ethyl ketone was added into the reaction vessel to produce a dispersed polymer solution having a concentration of 40%. The refractive index, acid value and weight average molecular weight of the above polymer were, respectively, 1.62, 65 and 32000. The refractive index of the polymer was measured with Abbe refractometer 3T. The acid value was determined by a titration using KOH of 0.1 mol/L. A part of the dispersed polymer was taken, and the weight average molecular weight was measured as a styrene conversion molecular weight when measuring a solvent as THF using gel permeation chromatography (GPC) of 7100 system manufactured by Hitachi, Ltd.

There were mixed 40 parts of the above dispersed polymer solution, 30 parts of Monarch 880 powder (manufactured by Cabot Corporation) as the carbon black, 100 parts of a sodium hydroxide solution of 0.1 mol/L and 30 parts of methyl ethyl ketone. The mixture was then dispersed for 15 passes at 200 MPa using a ultrahigh-pressure homogenizer (Ultimaizer HJP-25005, manufactured by Sugino Machine Limited). Thereafter, the dispersed mixture was moved to another container, and 300 parts of ion-exchanged water were added and stirring was carried out for another hour. The entire amount of methyl ethyl ketone and a part of the water were then distilled off using a rotary evaporator, and the pH was adjusted to 9 by neutralization by a 0.1 mol/L sodium hydroxide aqueous solution. Then filtration through a membrane filter of 0.3 μm was carried out, and a pigment dispersion 1 having a pigment concentration of 15% was prepared by the adjustment with the ion exchanged water.

(Manufacturing of Pigment Dispersion 2)

A pigment dispersion 2 was first prepared as in the pigment dispersion 1 by using pigment blue 15:1 (trichloro copper phthalocyanine pigment: G500, manufactured by Sanyo Color Works, Ltd.).

(Manufacturing of Pigment Dispersion 3)

A pigment dispersion 3 was first prepared as in the pigment dispersion 1 by using pigment violet 19 (quinacridone pigment: manufactured by Clariant).

(Manufacturing of Pigment Dispersion 4)

A pigment dispersion 3 was first prepared as in the pigment dispersion 1 by using pigment yellow 74 (condensed azo pigment: manufactured by Clariant).

(Preparation 1 of Ink for Inkjet Recording)

Hereinafter, examples of compositions suitable for the ink for inkjet recording are shown in Table 2. The ink for inkjet recording as the present invention was prepared by mixing the dispersion 1 prepared by the above method with vehicle components shown in Table 2. 0.05% of Topside 240 (manufactured by Permachem Asia Ltd.) in ion-exchanged water for prevention of corrosion of ink, 0.02% of benzotriazole in ion-exchanged water for prevention of corrosion of inkjet head parts, and 0.04% of EDTA (ethylenediamine tetraacetic acid)/2Na salt in ion-exchanged water for reducing the effects of metal ions in the ink system were used in the residual quantity of water in Table 2.

Comparative Example 1

In Comparative Example 1, dispersion liquids were prepared using polymers obtained by relatively reducing four kinds of highly refractive monomers in Example 1, relatively increasing the quantity of the buthyl acrylate to reduce the refractive index of a polymer, and synthesizing without changing the acid value. A dispersion using Monarch 880 powder (manufactured by Cabot Corporation) for black ink, a dispersion using pigment blue 15:1 (trichloro copper phthalocyanine pigment: G500, manufactured by Sanyo Color Works, Ltd.) for cyan ink, a dispersion using pigment violet 19 (quinacridone pigment: manufactured by Clariant) for magenta ink and a dispersion using pigment yellow 74 (condensed azo pigment: manufactured by Clariant) for yellow ink are respectively represented by a dispersion 5, a dispersion 6, a dispersion 7 and a dispersion 8. The ink was prepared in the same manner as in Example 1. Examples of the compositions of Comparative Example 1 are shown in Table 3.

Comparative Example 2

In Comparative Example 2, dispersion liquids were prepared by using polymers in which the quantity of the acrylic acid is changed in Example 1 and the acid value is changed. However, although a polymer having the acid value exceeding 200 can be dispersed, even when polymers of 40 and 30 of less than 50 were prepared, every polymer did not become a dispersion. A dispersion using Monarch 880 powder (manufactured by Cabot Corporation) for black ink, a dispersion using pigment blue 15:1 (trichloro copper phthalocyanine pigment: G500, manufactured by Sanyo Color Works, Ltd.) for cyan ink, a dispersion using pigment violet 19 (quinacridone pigment: manufactured by Clariant) for magenta ink and a dispersion using pigment yellow 74 (condensed azo pigment: manufactured by Clariant) for yellow ink are respectively represented by a dispersion 9, a dispersion 10, a dispersion 11 and a dispersion 12. The ink was prepared in the same manner as in Example 1. Examples of the compositions of Comparative Example 2 are shown in Table 4.

Comparative Example 3

In Comparative Example 3, dispersion liquids were prepared by using polymers obtained by changing sodium persulfate as a polymerization initiator, reaction temperature and amount of reaction time to change the molecular weight in Example 1. A dispersion using Monarch 880 powder (manufactured by Cabot Corporation) for black ink, a dispersion using pigment blue 15:1 (trichloro copper phthalocyanine pigment: G500, manufactured by Sanyo Color Works, Ltd.) for cyan ink, a dispersion using pigment violet 19 (quinacridone pigment: manufactured by Clariant) for magenta ink and a dispersion using pigment yellow 74 (condensed azo pigment: manufactured by Clariant) for yellow ink are respectively represented by a dispersion 13, a dispersion 14, a dispersion 15 and a dispersion 16. The ink was prepared in the same manner as in Example 1. Examples of the compositions of Comparative Example 3 are shown in Table 5.

(Evaluation 1 of Dispersion Stability)

The percentage changes in viscosity (%) upon leaving pigment inks for inkjet prepared by using dispersions which differ in the particle diameter of the pigment at 60° C. for 30 days are shown in Table 1. The dispersion stability is indicated as the percentage change in viscosity (%) upon leaving each ink at 60° C. for 30 days. For the percentage change in viscosity, viscosity values were measured at an angle of 60° C. using the AMVn, manufactured by Anton Paar GmbH (German), and 1-(value after 30 days)/(initial value) is indicated in the form of percentage (%).

(Evaluation 1 of Regular Paper OD and Gloss of Gloss Paper)

As regular paper, Xerox 4024 paper manufactured by U.S. Xerox was used, and as gloss paper, PM photograph paper manufactured by Seiko Epson Corporation was used. The inkjet printer EM930C, manufactured by Seiko Epson Corporation, was used as the printer and evaluations were made using samples printed at 720 dpi photo quality in the case of regular paper and samples printed at 1440 dpi photo quality in the case of gloss paper. The OD was measured using GRETAG MACBETH SPECTROSCAN SPM-50 manufactured by GRETAG COMPANY. Referring to the measurement of the gloss, the specular glossiness of a recorded surface was measured for an incidence angle of 60 degrees using a gloss checker (IG-320, manufactured by Horiba, Ltd.) and the average of five measurements was determined for each recording paper. PM photo paper, manufactured by Seiko Epson Corporation was used as the medium and printing at 720 dpi photo quality using the EM930C, manufactured by Seiko Epson Corporation, as the printer was carried out. The results are shown in Table 1.

(Measurement 1 of Discharge Stability)

Printing on 100 pages of A4-size Xerox P paper manufactured by Fuji Xerox at 4000 letters/page of standard of character size of 11 and MSP Gothic of Microsoft Word was carried out at 35° C. in 35% atmosphere by using the inkjet printer PX-V600, manufactured by Seiko Epson Corporation, and evaluated. AA indicates that no print distortions occurred, A indicates that one print distortion occurred, B indicates that print distortions occurred at 2 to 3 locations, C indicates that print distortions occurred at 4 to 5 locations, and D indicates that print distortions occurred at 6 or more locations. Table 1 shows the results.

TABLE 1

Evaluation Resulut of Dispersion Stability, Regular Paper OD, Gloss of Gloss Paper, and Discharge Stability

|  | Ink | Despersion | n | Acid Value | Mw | Stability | OD | Gloss | Discharge |
|---|---|---|---|---|---|---|---|---|---|
| Example 1 | 1 | 1 | 1.62 | 65 | 3.2 | 1.0 | 1.40 | 85 | A |
|  | 2 | 2 | 1.62 | 65 | 3.2 | 1.0 | 1.25 | 101 | AA |
|  | 3 | 3 | 1.62 | 65 | 3.2 | 1.0 | 1.20 | 98 | AA |
|  | 4 | 4 | 1.62 | 65 | 3.2 | 1.0 | 1.25 | 97 | AA |
| Comparative | 5 | 5 | 1.52 | 65 | 3.3 | 1.0 | 1.35 | 68 | A |
| Example 1 | 6 | 6 | 1.48 | 65 | 3.1 | 1.0 | 1.14 | 80 | AA |
|  | 7 | 7 | 1.46 | 65 | 3.3 | 1.0 | 1.18 | 78 | AA |
|  | 8 | 8 | 1.44 | 65 | 3.2 | 1.0 | 1.20 | 76 | AA |
| Comparative | 9 | 9 | 1.60 | 220 | 3.1 | 1.5 | 1.10 | 73 | A |
| Example 2 | 10 | 10 | 1.59 | 250 | 3.0 | 1.8 | 1.03 | 78 | A |
|  | 11 | 11 | 1.56 | 270 | 3.2 | 2.1 | 1.08 | 76 | A |
|  | 12 | 12 | 1.54 | 290 | 3.1 | 4.1 | 1.00 | 70 | A |
| Comparative | 13 | 13 | 1.58 | 65 | 12.1 | 1.7 | 1.32 | 73 | C |
| Example 3 | 14 | 14 | 1.57 | 65 | 13.1 | 1.6 | 1.15 | 75 | C |
|  | 15 | 15 | 1.54 | 65 | 1.5 | 1.6 | 1.16 | 74 | B |
|  | 16 | 16 | 1.52 | 65 | 1.8 | 1.4 | 1.15 | 65 | B | n: Refractive index of dispersion polymer
Mw: Weight avarage molecular weight (×10000)
Stability: Preservation stability
OD: Gloss on gloss paper
Discharge: Discharge stability

TABLE 2

Ink Composition of Example 1 (% by weight)

|  | Ink | | | |
|---|---|---|---|---|
|  | 1 | 2 | 3 | 4 |
| Despersion 1 | 40.0 | — | — | — |
| Despersion 2 | — | 26.7 | — | — |
| Dispersion 3 | — | — | 30.0 | — |
| Dispersion 4 | — | — | — | 30.0 |
| TEGmBE | 2.0 | 1.0 | 1.0 | 1.0 |
| 1,2-HD | 3.0 | 4.0 | 4.0 | 4.0 |
| Glycerin | 10.0 | 15.0 | 10.0 | 10.0 |
| TMP | 4.0 | 7.0 | 5.0 | 5.0 |

TABLE 2-continued

Ink Composition of Example 1 (% by weight)

| | Ink | | | |
|---|---|---|---|---|
| | 1 | 2 | 3 | 4 |
| S-104 | 0.15 | 0.15 | 0.15 | 0.15 |
| S-601 | 0.02 | — | — | — |
| Ion-exchange water | Residual | Residual | Residual | Residual |

TEGmBE: Triethylene glycol monobutyl ether
1,2-HD: 1,2-hexanediol
TMP: Trimethylolpropane
S-104: Surfynol 104 (acetylene glycol-based surfactant, manufactured by Nisshin Chemical Industry)
S-601: Surfynol 601 (acetylene glycol-based surfactant, manufactured by Nisshin Chemical Industry)

TABLE 3

Ink Composition of Comparative Example 1 (% by weight)

| | Ink | | | |
|---|---|---|---|---|
| | 5 | 6 | 7 | 8 |
| Dispersion 5 | 40.0 | — | — | — |
| Dispersion 6 | — | 26.7 | — | — |
| Dispersion 7 | — | — | 30.0 | — |
| Dispersion 8 | — | — | — | 30.0 |
| TEGmBE | 2.0 | 1.0 | 1.0 | 1.0 |
| 1,2-HD | 3.0 | 4.0 | 4.0 | 4.0 |
| Glycerin | 10.0 | 15.0 | 10.0 | 10.0 |
| TMP | 4.0 | 7.0 | 5.0 | 5.0 |
| S-104 | 0.15 | 0.15 | 0.15 | 0.15 |
| S-601 | 0.02 | — | — | — |
| Ion exchange-water | Residual | Residual | Residual | Residual |

TABLE 4

Ink Composition of Comparative Example 2 (% by weight)

| | Ink | | | |
|---|---|---|---|---|
| | 9 | 10 | 11 | 12 |
| Dispersion 9 | 40.0 | — | — | — |
| Dispersion 10 | — | 26.7 | — | — |
| Dispersion 11 | — | — | 30.0 | — |
| Dispersion 12 | — | — | — | 30.0 |
| TEGmBE | 2.0 | 1.0 | 1.0 | 1.0 |
| 1,2-HD | 3.0 | 4.0 | 4.0 | 4.0 |
| Glycerin | 10.0 | 15.0 | 10.0 | 10.0 |
| TMP | 2.0 | 5.0 | 3.0 | 3.0 |
| S-104 | 0.15 | 0.15 | 0.15 | 0.15 |
| S-601 | 0.02 | — | — | — |
| Ion exchange-water | 残量 | 残量 | 残量 | 残量 |

TABLE 5

Ink Composition of Comparative Example 3 (% by weight)

| | Ink | | | |
|---|---|---|---|---|
| | 13 | 14 | 15 | 16 |
| Dispersion 13 | 40.0 | — | — | — |
| Dispersion 14 | — | 26.7 | — | — |
| Dispersion 15 | — | — | 30.0 | — |
| Dispersion 16 | — | — | — | 30.0 |
| TEGmBE | 2.0 | 1.0 | 1.0 | 1.0 |
| 1,2-HD | 3.0 | 4.0 | 4.0 | 4.0 |
| Glycerin | 10.0 | 15.0 | 10.0 | 10.0 |
| TMP | 2.0 | 5.0 | 6.0 | 6.0 |
| S-104 | 0.15 | 0.15 | 0.15 | 0.15 |
| S-601 | 0.02 | — | — | — |
| Ion exchange-water | Residual | Residual | Residual | Residual |

Example 2

(Manufacturing of Pigment Dispersion 17)

As the pigment dispersion 1, there was used Monarch 880 manufactured by U.S. Cabot Corporation as carbon black (PBk7). After a gas in a reaction vessel equipped with a stirrer, a thermometer, a reflux pipe and a dropping funnel is replaced with nitrogen, 25 parts of the above highly refractive acrylate A3, 25 parts of the above highly refractive methacrylate M3, 10 parts of a phenyl thiocyanate, 2 parts of an acrylic acid, and 0.3 parts of t-dodecyl mercaptan were placed into the reaction vessel and heated at 70° C. 50 parts of the above highly refractive acrylate A4 independently prepared, 50 parts of the above highly refractive meta-acrylate M3, 50 parts of the above highly refractive meta-acrylate M4, 13 parts of the acrylic acid, 5 parts of a butyl acrylate, 1 part of t-dodecyl mercaptan, 20 parts of methyl ethyl ketone and 1 part of sodium persulfate were placed into the dropping funnel, and the polymerization reaction of the dispersed polymer was carried out while being dropped into the reaction vessel for 4 hours. Next, methyl ethyl ketone was added into the reaction vessel to produce a dispersed polymer solution having a concentration of 40%. The refractive index, acid value and weight average molecular weight of the above polymer were respectively 1.65, 65 and 33000. The refractive index of the polymer was measured by Abbe refractometer 3T. The acid value was determined by a titration using KOH of 0.1 mol/L. A part of the dispersed polymer was taken and the weight average molecular weight was measured as a styrene conversion molecular weight when measuring a solvent as THF using gel permeation chromatography (GPC) of 7100 system manufactured by Hitachi, Ltd.

There were mixed 40 parts of the above dispersed polymer solution, 30 parts of Monarch 880 powder (manufactured by Cabot Corporation) as the carbon black, 100 parts of a sodium hydroxide solution of 0.1 mol/L and 30 parts of methyl ethyl ketone. The mixture was then dispersed for 15 passes at 200 MPa using a ultrahigh-pressure homogenizer (Ultimaizer HJP-25005, manufactured by Sugino Machine Limited). Thereafter, the dispersed mixture was moved to another container, and 300 parts of ion-exchanged water were added and stirring was carried out for another hour. The entire amount of methyl ethyl ketone and a part of the water were then distilled off using a rotary evaporator, and the pH was adjusted to 9 by neutralization by a 0.1 mol/L sodium hydroxide aqueous solution. Then filtration through a membrane filter of 0.3 μm was carried out, and a pigment dispersion 5 having a pigment concentration of 15% was prepared by the adjustment with the ion exchanged water.

(Manufacturing of Pigment Dispersion 18) A dispersion 18 was first prepared as in the dispersion 17 by using pigment blue 15:4 (copper phthalocyanine pigment: manufactured by Clariant).

(Manufacturing of Pigment Dispersion 19)

A dispersion 19 was first prepared as in the dispersion 17 by using pigment red 122 (dimethyl quinacridone pigment: manufactured by Clariant).

(Manufacturing of Pigment Dispersion 20)

A dispersion 20 was first prepared as in the dispersion 17 by using pigment yellow 180 (diketopyrolopyrrole pigment: manufactured by Clariant).

(Preparation 2 of Ink for Inkjet)

Hereinafter, examples of compositions suitable for the ink for inkjet recording are shown in Table 8. The ink for inkjet recording was prepared as in Example 1.

Comparative Example 4

In Comparative Example 4, dispersion liquids were prepared using polymers obtained by relatively reducing four kinds of highly refractive monomers in Example 2, relatively increasing the quantity of buthyl acrylate to reduce the refractive index of a polymer, and synthesizing without changing the acid value. A dispersion using Monarch 880 powder (manufactured by Cabot Corporation) for black ink, a dispersion using pigment blue 15:4 (copper phthalocyanine pigment: manufactured by Clariant) for cyan ink, a dispersion using pigment red 122 (dimethyl quinacridone pigment: manufactured by Clariant) for magenta ink and a dispersion using pigment yellow 180 (diketopyrolopyrrole pigment: manufactured by Clariant) for yellow ink are respectively represented by a dispersion 21, a dispersion 22, a dispersion 23 and a dispersion 24. The ink was prepared in the same manner as in Example 2. Examples of the compositions of Comparative Example 4 are shown in Table 8.

Comparative Example 5

In Comparative Example 5, dispersion liquids were prepared by using polymers in which the quantity of an acrylic acid is changed in Example 2 and an acid value is changed. However, although a polymer having the acid value exceeding 200 can be dispersed, even polymers of 40 and 30 of less than 50 were prepared, every polymer did not become a dispersion. A dispersion using Monarch 880 powder (manufactured by Cabot Corporation) for black ink, a dispersion using pigment blue 15:4 (copper phthalocyanine pigment: manufactured by Clariant) for cyan ink, a dispersion using pigment red 122 (dimethyl quinacridone pigment: manufactured by Clariant) for magenta ink and a dispersion using pigment yellow 180 (diketopyrolopyrrole pigment: manufactured by Clariant) for yellow ink are respectively represented by a dispersion 25, a dispersion 26, a dispersion 27 and a dispersion 28. The ink was prepared in the same manner as in Example 2. Examples of the compositions of Comparative Example 5 are shown in Table 9.

Comparative Example 6

In Comparative Example 6, dispersion liquids were prepared by using polymers obtained by changing sodium persulfate as a polymerization initiator, reaction temperature and the amount of reaction time in Example 2 and changing molecular weight. A dispersion using Monarch 880 powder (manufactured by Cabot Corporation) for black ink, a dispersion using pigment blue 15:4 (copper phthalocyanine pigment: manufactured by Clariant) for cyan ink, a dispersion using pigment red 122 (dimethyl quinacridone pigment: manufactured by Clariant) for magenta ink and a dispersion using pigment yellow 180 (diketopyrolopyrrole pigment: manufactured by Clariant) for yellow ink are respectively represented by a dispersion 29, a dispersion 30, a dispersion 31 and a dispersion 32. The ink was prepared in the same manner as in Example 1. Examples of the compositions of Comparative Example 6 are shown in Table 10.

(Evaluation 2 of Dispersion Stability)

The evaluation of dispersion stability was carried out in the same manner as in Example 1. The results are shown in Table 6.

(Evaluation 2 of Regular Paper OD and Gloss of Gloss Paper)

The regular paper OD and the gloss of the gloss paper were evaluated in the same manner as in Example 1. The results are shown in Table 6.

(Measurement 2 of Discharge Stability)

The measurement of discharge stability was carried out in the same manner as in Example 1. The results are shown in Table 6.

TABLE 6

Evaluation Resulut of Dispersion Stability, Regular Paper OD, Gloss of Gloss Paper, and Discharge Stability

|  | Ink | Dispersion | n | Acid value | Mw | Stability | OD | Gloss | Discharge |
|---|---|---|---|---|---|---|---|---|---|
| Example 2 | 29 | 17 | 1.65 | 65 | 3.3 | 1.0 | 1.42 | 86 | A |
|  | 30 | 18 | 1.65 | 65 | 3.3 | 1.0 | 1.28 | 103 | AA |
|  | 31 | 19 | 1.65 | 65 | 3.3 | 1.0 | 1.23 | 100 | AA |
|  | 32 | 20 | 1.65 | 65 | 3.3 | 1.0 | 1.27 | 99 | AA |
| Comparative | 33 | 21 | 1.54 | 65 | 3.5 | 1.0 | 1.37 | 70 | A |
| Example 4 | 34 | 22 | 1.49 | 65 | 3.3 | 1.0 | 1.16 | 81 | AA |
|  | 35 | 23 | 1.47 | 65 | 3.4 | 1.0 | 1.19 | 78 | AA |
|  | 36 | 24 | 1.46 | 65 | 3.0 | 1.0 | 1.21 | 78 | AA |
| Comparative | 37 | 25 | 1.61 | 220 | 3.3 | 1.4 | 1.12 | 75 | A |
| Example 5 | 38 | 26 | 1.60 | 250 | 3.2 | 1.9 | 1.03 | 77 | A |
|  | 39 | 27 | 1.58 | 230 | 3.0 | 2.3 | 1.08 | 75 | A |
|  | 40 | 28 | 1.57 | 270 | 3.3 | 4.4 | 1.01 | 71 | A |
| Comparative | 41 | 29 | 1.59 | 65 | 13.2 | 1.8 | 1.33 | 74 | C |
| Example 6 | 42 | 30 | 1.57 | 65 | 14.8 | 1.9 | 1.17 | 76 | C |
|  | 43 | 31 | 1.56 | 65 | 1.5 | 1.9 | 1.18 | 76 | B |
|  | 44 | 32 | 1.54 | 65 | 1.8 | 1.9 | 1.16 | 67 | B |

TABLE 7

Ink Composition of Example 2 (% by weight)

| | Ink 29 | Ink 30 | Ink 31 | Ink 32 |
|---|---|---|---|---|
| Dispersion 17 | 42.0 | — | — | — |
| Dispersion 18 | — | 23.5 | — | — |
| Dispersion 19 | — | — | 35.0 | — |
| Dispersion 20 | — | — | — | 41.0 |
| TEGmBE | 2.0 | 1.0 | 1.0 | 1.0 |
| 1,2-HD | 3.0 | 4.0 | 4.0 | 4.0 |
| Glycerin | 10.0 | 15.0 | 10.0 | 10.0 |
| TMP | 4.0 | 7.0 | 5.0 | 5.0 |
| S-104 | 0.15 | 0.15 | 0.15 | 0.15 |
| S-601 | 0.02 | — | — | — |
| Ion exchange-water | Residual | Residual | Residual | Residual |

TABLE 8

Ink Composition of Comparative Example 4 (% by weight)

| | Ink 33 | Ink 34 | Ink 35 | Ink 36 |
|---|---|---|---|---|
| Dispersion 21 | 42.0 | — | — | — |
| Dispersion 22 | — | 23.5 | — | — |
| Dispersion 23 | — | — | 35.0 | — |
| Dispersion 24 | — | — | — | 41.0 |
| TEGmBE | 2.0 | 1.0 | 1.0 | 1.0 |
| 1,2-HD | 3.0 | 4.0 | 4.0 | 4.0 |
| Glycerin | 10.0 | 15.0 | 10.0 | 10.0 |
| TMP | 4.0 | 7.0 | 5.0 | 5.0 |
| S-104 | 0.15 | 0.15 | 0.15 | 0.15 |
| S-601 | 0.02 | — | — | — |
| Ion-exchange water | Residual | Residual | Residual | Residual |

TABLE 9

Ink Composition of Comparative Example 5 (% by weight)

| | Ink 37 | Ink 38 | Ink 39 | Ink 40 |
|---|---|---|---|---|
| Dispersion 25 | 42.0 | — | — | — |
| Dispersion 26 | — | 23.5 | — | — |
| Dispersion 27 | — | — | 35.0 | — |
| Dispersion 28 | — | — | — | 41.0 |

TABLE 9-continued

Ink Composition of Comparative Example 5 (% by weight)

| | Ink 37 | Ink 38 | Ink 39 | Ink 40 |
|---|---|---|---|---|
| TEGmBE | 2.0 | 1.0 | 1.0 | 1.0 |
| 1,2-HD | 3.0 | 4.0 | 4.0 | 4.0 |
| Glycerin | 10.0 | 15.0 | 10.0 | 10.0 |
| TMP | 2.0 | 5.0 | 3.0 | 3.0 |
| S-104 | 0.15 | 0.15 | 0.15 | 0.15 |
| S-601 | 0.02 | — | — | — |
| Ion-exchange water | Residual | Residual | Residual | Residual |

TABLE 10

Ink Composition of Comparative Example 6 (% by weight)

| | Ink 41 | Ink 42 | Ink 43 | Ink 44 |
|---|---|---|---|---|
| Dispersion 29 | 42.0 | — | — | — |
| Dispersion 30 | — | 23.5 | — | — |
| Dispersion 31 | — | — | 35.0 | — |
| Dispersion 32 | — | — | — | 41.0 |
| TEGmBE | 2.0 | 1.0 | 1.0 | 1.0 |
| 1,2-HD | 3.0 | 4.0 | 4.0 | 4.0 |
| Glycerin | 10.0 | 15.0 | 10.0 | 10.0 |
| TMP | 2.0 | 5.0 | 6.0 | 6.0 |
| S-104 | 0.15 | 0.15 | 0.15 | 0.15 |
| S-601 | 0.02 | — | — | — |
| Ion-exchange water | Residual | Residual | Residual | Residual |

What is claimed is:

1. An ink for inkjet recording comprising water and a pigment, wherein the pigment is dispersed using a polymer having a refractive index of at least 1.58 or more, an acid value of 50 mgKOH/g to 120 mgKOH/g, and a weight average molecular weight of 20000 to 120000, wherein the polymer is prepared with a (meth) acrylic acid tritylester and/or a (meth) acrylic acid tritylthioester which have at least a plurality of aromatic rings.

2. The ink for inkjet recording according to claim 1, further comprising 1,2-alkylene glycol.

3. The ink for inkjet recording according to claim 1, further comprising an acetylene glycol-based surfactant and/or an acetylene alcohol-based surfactant.

* * * * *